Dec. 17, 1968   J. H. CASTOE   3,416,216
MOTOR VEHICLE WHEEL SUSPENSION BALL JOINT INSTALLING TOOL
Filed Jan. 30, 1967   3 Sheets-Sheet 1
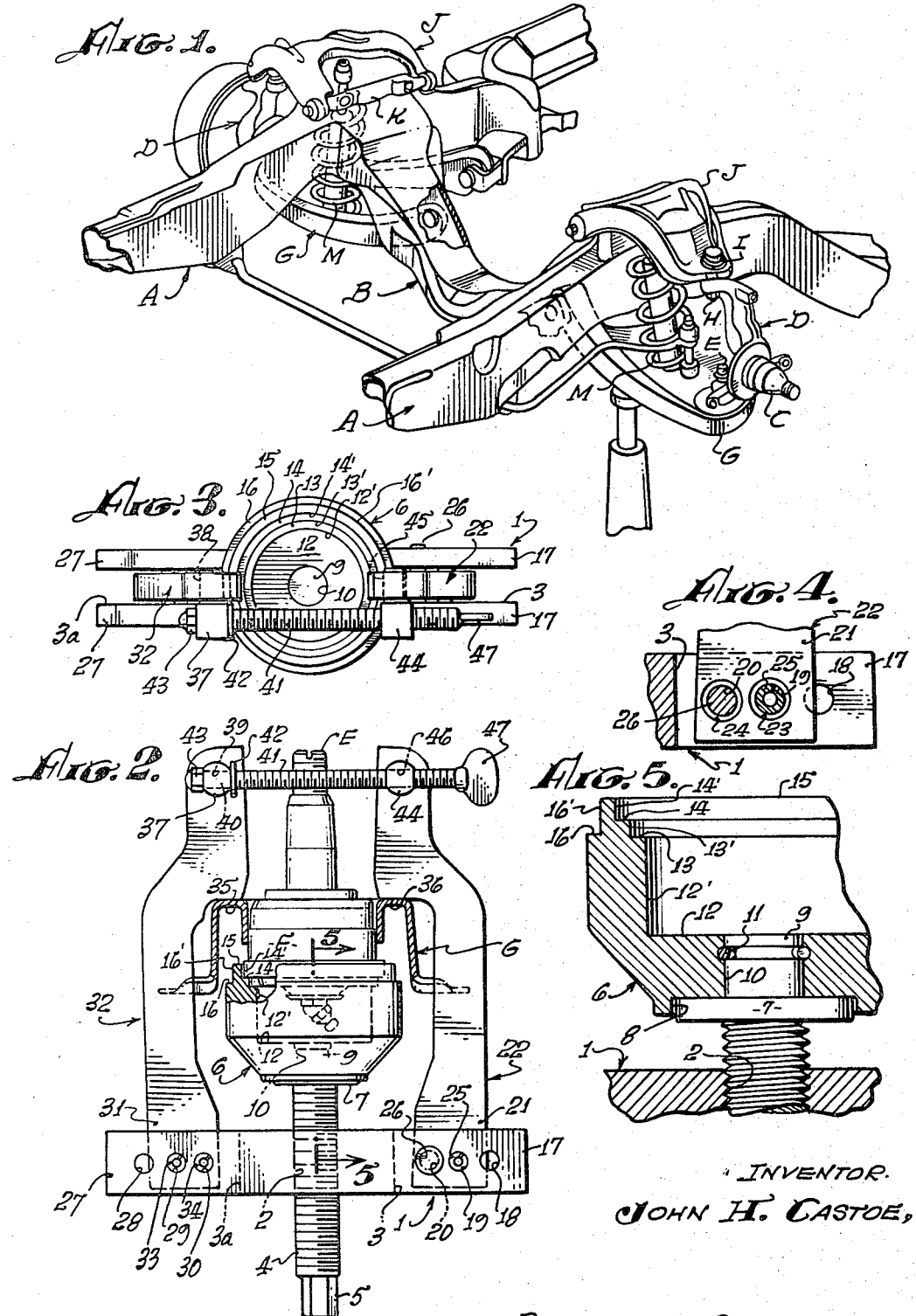
INVENTOR.
JOHN H. CASTOE,
By Harold J. LeVesconte
ATTORNEY

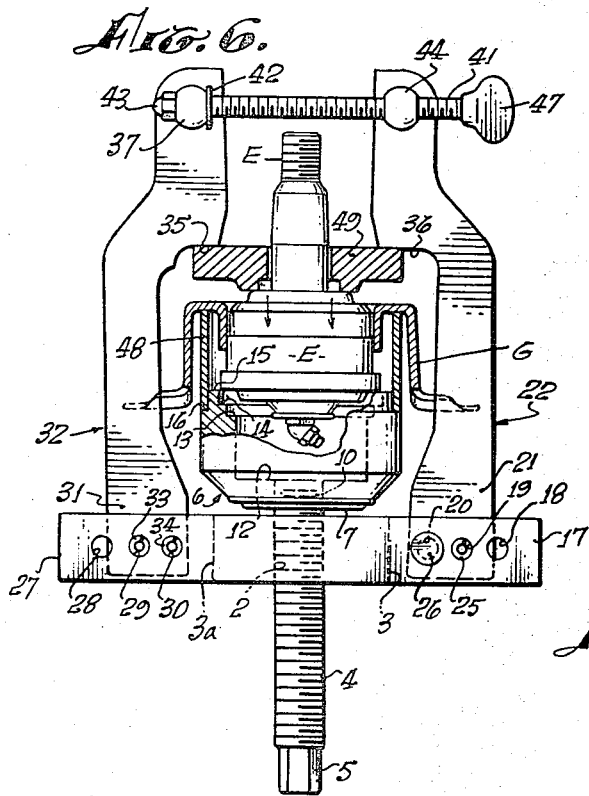
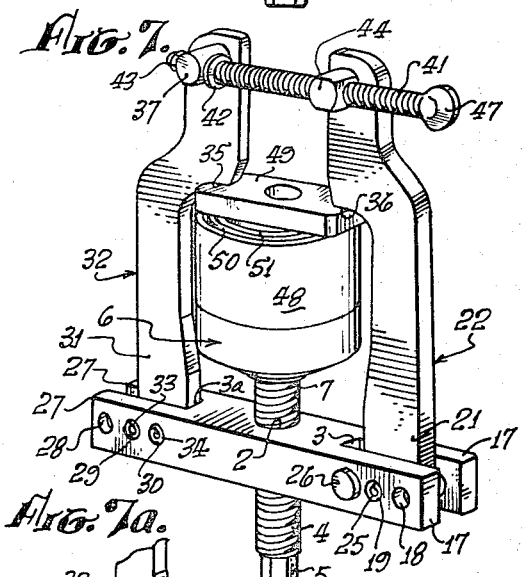
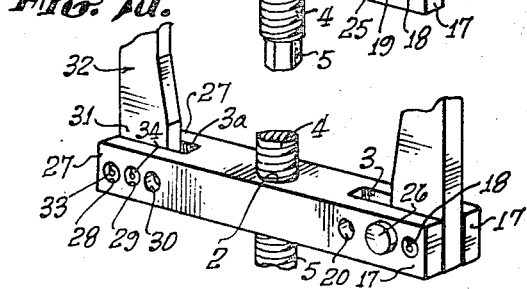
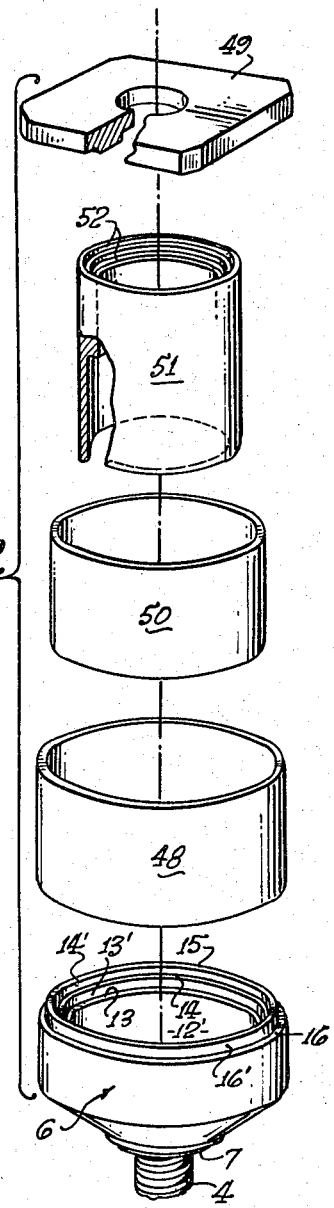

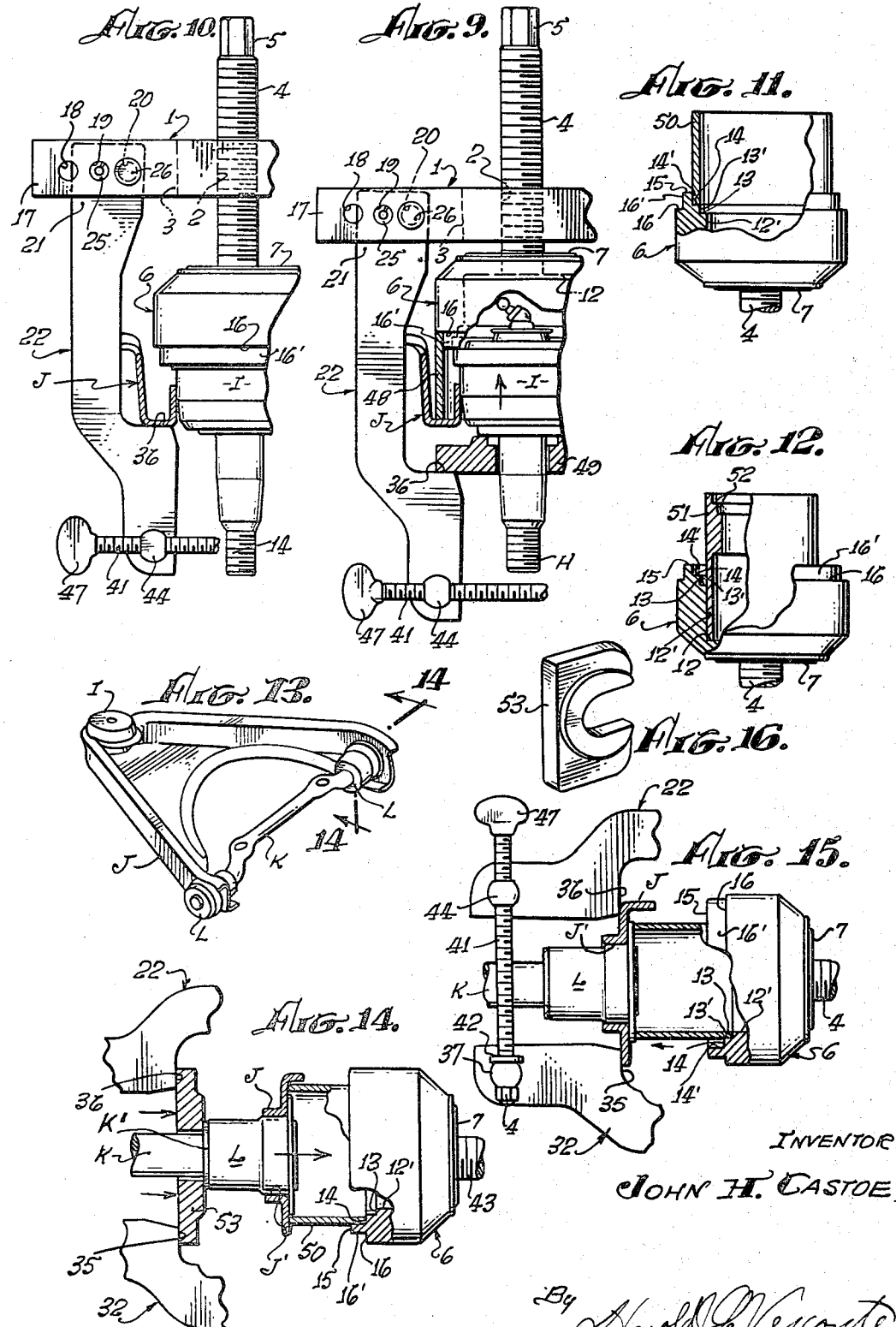

United States Patent Office 3,416,216
Patented Dec. 17, 1968

3,416,216
MOTOR VEHICLE WHEEL SUSPENSION BALL
JOINT INSTALLING TOOL
John H. Castoe, 6718 Shady Grove St.,
Tujunga, Calif. 91042
Filed Jan. 30, 1967, Ser. No. 612,702
7 Claims. (Cl. 29—261)

ABSTRACT OF THE DISCLOSURE

A screw operated tool for in situ, press fit installation of steering knuckle support ball joint assemblies in the arm components of motor vehicle front wheel suspension means. Means is provided to accommodate different diameters of ball joint assemblies and different widths of the arm component at the openings in which the ball joint assemblies are installed. Adaptors are provided, whereby the tool is additionally employable to press out ball joint assemblies which are to be replaced.

Background

Until recently motor vehicle maintenance and service manuals have specified that for the removal and replacement of the steering knuckle supporting ball joints of front wheel suspension systems, it is necessary to remove the steering knuckle supporting arms (which means the dismantling of the entire wheel suspension system), then take the removed arms to a work station, effect the removal and replacement of the ball joints and thereafter reassemble the entire suspension system. The actual work involved in such removal and replacement of the ball joints is usually less than one-quarter of the time involved in the entire operation. More recently some attempts have been made by manufacturers to provide a tool usable to effect such replacement in situ but those tools have been limited to the specific makes for which they were intended.

Summary

The invention is directed to and has for its principal objective the provision of a tool usable on a wide range of makes and models of motor vehicles and operable to press out the bearing element to be replaced in a wheel suspension arm while that arm remains in situ and is disconnected only at the point at which the replacement is to be made thus saving the time of disassembling the entire wheel suspension means and reassembling it after the replacement of the steering knuckle supporting ball joint has been effected. Additionally, the device of the invention, as will presently appear, is capable of use for the removal and replacement of the bushings by which the steering knuckle supporting arms are hinged to the vehicle frame structure, although, in this operation, it is usually necessary to dismantle the wheel suspension means.

Specification

The accompanying drawings illustrate a presently preferred embodiment of the invention which embodiment is described in detail in the specification following and in said drawings:

FIG. 1 is a perspective view of a typical front end wheel suspension system for a motor vehicle with which the tool of the present invention is intended to be used, FIG. 2 is a side elevational view of a tool comprising the said presently preferred embodiment of the invention applied to the outboard or steering knuckle end of a lower supporting arm therefor and is shown as starting to press a steering knuckle supporting ball joint means into place in the arm, a portion of the tool being broken away to disclose interior construction, FIG. 3 is a top plan view having reference to FIG. 2, FIG. 4 is an enlarged scale, fragmentary side elevational view of a portion of the frame structure of the tool showing particularly an adjusting means for adjusting the tool to ball joint size, FIG. 5 is an enlarged fragmentary view taken on the line 5—5 of FIG. 2, FIG. 6 is a side elevational view similar to FIG. 2 but showing the tool arranged and installed for removing a steering knuckle supporting ball joint from a lower supporting arm of a wheel suspension means, FIG. 7 is a perspective view of the tool shown in the preceding views with all of the adaptor parts thereof nested for storage as a unit, FIG. 7a is a fragmentary view similar to the lower portion of FIG. 7 but showing the frame members of the tool adjusted laterally outwardly to accommodate wider ends of steering knuckle supporting arms, FIG. 8 is an exploded view of typical ball joint and bushing engaging adaptor components of the tool together with the head component on which said adaptor components are mounted in use, FIG. 9 is a fragmentary view illustrating a typical use of the tool in removing a steering knuckle supporting ball joint from an upper supporting arm, FIG. 10 is a view similar to FIG. 9 but showing the tool as employed to replace a ball joint in the upper supporting arm shown in FIG. 9, FIGS. 11 and 12 are fragmentary, partially sectional views showing the mode of mounting adaptors for smaller sizes of ball joints and bushings, FIG. 13 is a perspective view of an upper arm of a wheel suspension means together with the supporting cross-shaft by which it is secured to the vehicle chassis, FIG. 14 is an enlarged scale, fragmentary, sectional view taken on the longitudinal axial line of the bushing of cross-shaft to which the device is applied in FIG. 13 arranged to remove the bushing from the supporting arm, FIG. 15 is a view similar to FIG. 14 but showing the tool arranged to install a bushing at the same point as in FIG. 14, and FIG. 16 is a perspective view of an adaptor element employed in removing a bushing in an operation such as shown in FIG. 14.

Referring to the drawings, FIG. 1 shows a typical motor vehicle front end assembly and certain of the other figures show the specific components of the front end assembly with which the tool of the present invention is concerned. Specifically, the illustrated front end assembly comprises frame side members A, A and a front crossmember B rigidly fixed thereto. Having regard to FIG. 1, since the front wheel mounting means are mirror image duplicates, a description of one will serve for both. The front wheel of the vehicle is mounted on a spindle portion C of a steering knuckle D and the steering knuckle includes a lower laterally extending arm portion which is rigidly connected to the upwardly extending shank E of a ball joint assembly F in the distal end of a lower supporting arm G which at its opposite end is pivotally connected to the frame structure of the vehicle. The upper end of the steering knuckle includes a laterally extending arm which is rigidly connected to a depending shank H of a ball joint member I at the distal end of the upper supporting arm J which is pivotally mounted on the ends of a cross-shaft member K adjustably secured to the frame cross-member B by means affording adjustment to provide desired caster and camber to the wheel. Torsion resistant resilient bushings L are interposed between the cross-shaft K and the supporting arm J and a coil spring M reacting between the upper surface of the lower arm and a vertically opposite under face portion of the frame structure affords resilient support for the frame of the vehicle.

The illustrated embodiment of the invention includes a base member 1 comprising a rectangular metal bar having a threaded bore 2 extending therethrough at its midlength and having slots 3 and 3a extending inwardly from the opposite ends thereof, said slots being parallel to the axial line of the threaded bore 2 and to each other. A jackscrew 4 threadedly engages the bore 2 and projects beyond both ends of said bore, said jackscrew member having a hexagonal portion 5 at one end thereof for engagement with a wrench or the like, the opposite end of said jackscrew being shaped to freely rotatably support a generally cylindrical head member 6. Specifically, the said other end of the jackscrew is provided with an annular flange portion 7 which is received in a complementary recess 8 in the head member 6 and the jackscrew is further provided with a cylindrical pilot portion 9 extending beyond the flange into an axial bore 10 in the head member 6. The pilot portion 9 and the bore 10 are provided with opposed peripheral grooves in which a spring ring 11 is received, the difference in the groove diameters of the pilot and bore being sufficient to accommodate compression of the ring incident to interlocking assembly of the jackscrew 4 and head 6 and the width of the grooves for the spring ring is such as to insure that axial thrust is received only against the flange 7.

The outer end surface of the head 6 is formed to provide a plurality of end surfaces of different diameters which are complementary to the portions of the ball joint assemblies or bushings to be removed and installed or to accommodate certain adaptor components to be presently described. In the illustrated embodiment of the invention, these surfaces will be designated in the order of increasing diameter as end surfaces 12, 13, 14, 15 and 16 and the adjacent peripheral walls designated as 12', 13', 14' and 16', it being noted that the end surface 15 is not provided with a corresponding peripheral wall surface.

The base member arms 17, 17 formed by the slot 3 are provided with three equally spaced, transversely extending, axially aligned pairs of bores 18, 19 and 20 and loosely disposed in the slot 3 is the end 21 of a first frame member 22 having two bores 23 and 24 which are slightly larger in diameter than the bores 18, 19 and 20 but which are spaced apart at the same distance as adjacent ones of the bores 18, 19 and 20. As shown in the drawings, the spring pin 25 forms a driving fit with the hole 19 and extends through the hole 23 in the member 22 to effect a loose pivotal connection of the end 21 of the member 22 with the base member 1, the thickness of the member 22 being such as to move freely in the slot 3 with such capacity for lateral movement as will accommodate self-alignment of the device incident to use. In those instances in which it is desired to limit the rocking movement of the member 22 about the pin 25, a dowel pin 26 may be inserted in the hole 20. While the position of the member 22 shown in the drawings is that which will accommodate most intended uses of the device, if necessary, the spring pin 25 can be removed and transferred to the hole 18 thus moving the member 22 outwardly away from the jackscrew and, in that event, the dowel pin would, where desired, be inserted in the hole 19 and reengage the hole 24 in the member 22 as shown in FIG. 7a.

The arms 27, 27 formed by the slot 3a in the base member are similarly provided with a series of three, equally spaced pairs of transversely extending, axially aligned holes 28, 29 and 30 and disposed in the slot 3a is the end portion 31 of a second frame member 32, said end like the end 21 of member 22 having two holes extending therethrough of larger diameter than the holes 28, 29 and 30 but being spaced from each other the same distance as adjacent ones of the holes 28, 29 and 30. In the arrangement here shown, a first spring pin 33 extends through the hole 29 and the one of the two holes in the frame member end 31 which is nearest the open end of the slot and a second spring pin 34 extends through the hole 30 and the other of the holes in the frame member 31. If desired, these spring pins can be driven out and moved to the holes 28 and 29 to move the frame member end 30 toward the open end of the slot 3a as also shown in FIG. 7a. Depending on the supporting arm with which the device is to be used, either one or both of the frame members may be thus adjusted in their respective slots to accommodate the width of a wheel supporting arm end portion to be serviced, it being recognized that there is a wide range of dimensions to be thus accommodated due to differences in front wheel suspension system designs.

The frame members 22 and 32 extend in generally spaced parallel relation at right angles to the base member 1 from the side thereof adjacent the head member 6 and, as shown in the drawings, they are spaced from the head member. At a point about the limit of outward projection of the head 6 by the jackscrew 4, the frame members are offset toward the axial line of the jackscrew with resultant formation of shoulder surfaces 35 and 36. Beyond these shoulders, the frame members continue parallel to each other a short distance to their respective distal ends.

The distal end of the frame member 32 carries a bearing block member 37 having a shank 38 freely rotatably received in a hole extending through the frame member 32 and secured therein by any appropriate means such as by riveting. The bearing block 37 has a hole 39 extending therethrough parallel to the side face of the member 32, and in which hole, the distal end 40 of an adjusting screw member 41 is freely rotatably received, said screw member having a flange portion 42 engaging the side of the bearing block and said distal end projecting through the hole 39 and carrying a nut element 43 which cooperates with the flange 42 to prevent endwise movement of the screw member 41 relative to the bearing block 37.

The corresponding distal end of the frame member 22 carries a nut element 44 provided with a shank portion 45 freely rotatably secured in the distal end of the frame member and said nut element is provided with a threaded bore 46 extending therethrough in which the threads of the screw 41 are engaged. The screw 41 extends beyond the nut element 44 and terminates in a flattened end portion 47 affording means for manual rotation of the screw. Turning the screw 41 in one direction tends to move the frame members 22 and 32 apart and rotation in the opposite direction tends to move them toward each other. It should be noted that at this point the screw 41 is laterally offset from the axial line of the jackscrew 4 and the purpose and advantage of this will later become apparent.

The remaining components of the device can best be described in connection with a description of the major steps in the replacement of a pair of steering knuckles supporting ball joints in the upper and lower supporting arms of a wheel suspension means. The vehicle is supported in any suitable manner not involving the wheel suspension means and the wheel is removed from the spindle C. The spring M is compressed by the use of a suitable tool for that purpose and removed and the associated shock absorber is disconnected. The steering knuckle is disconnected from the free ends of the upper and lower arms G and J. Assuming that the ball joint E carried by the lower arm G is first to be replaced, a rigid sleeve (here shown as the sleeve 48) is fitted to the head member 6 engaging the end face 16 thereof. The head and jackscrew are retracted and the sleeve 48 is fitted over the lower end of the ball joint head portion and around the skirt portion G' which defines the opening in the supporting arm in which the ball joint head has been press fitted. Prior to this, the block 49 has been placed over the shank E of the ball joint and the screw 41 of the device is manipulated to bring the shoulder portions 35 and 36 over the block 49. Operation of the jackscrew 4 upwardly through the base member will tend to move the entire device downwardly causing the block 49 to push the ball joint into the cavity formed by the sleeve 48 and the interior of the head 6, it being noted that the cavity formed by the head and sleeve accommodates the ball joint and its associated lubrication fitting. It may be noted at this point that the lateral offset of the screw 41 permits the frame members 22 and 32 to be shorter than would be the case if this screw were disposed in the axial line of the device. After the device and the removed ball joint has been removed from the end of the supporting arm G, the sleeve 48 and block 49 are discarded. The ball joint to be installed is located in the end of the head 6, in the illustrated example, resting on the end face 14 and held against shifting thereon by the peripheral wall 14', the depth of the head cavity affording clearance for the lubrication fitting of the ball joint, and the device together with the new ball joint are replaced on the end of the arm G and the frame members 22 and 32 are adjusted by the screw 41 so that the shoulders 35 and 36 engage the upper surface of the arm at opposite sides of the hole in which the ball joint F is to be pressed. The jackscrew is again rotated to move upwardly through the base member but the reaction is now against the upper face of the arm G with the result that the ball joint is pressed into place to the extent determined by the locating shoulders F' thereon.

The same steps are followed with respect to replacing the ball joint in the upper arm J as shown in FIGS. 9 and 10 with the exception that the device is, of course, employed in inverted attitude having reference to FIGS. 2 and 6. Where the width of the end of the supporting arm requires it, the frame members 22 and 32 or at least one of them can of course be moved outwardly from the position shown in the drawings by the means described. After the ball joints have been installed, the steering knuckle is again connected to the ball joint shanks, the spring released and the operation is complete.

One advantage of this mode of replacement of ball joints with the arms in situ is that the existing caster, camber, and toe in adjustments need not be disturbed. Where the supporting arms are completely removed as has often been the practice heretofore, the reassembly of the suspension means is completed by resetting of the front wheel adjustments. Thus, not only is there a saving of time of disassembly and reassembly but also there is a saving of the time and cost involved in realigning the front wheels.

Smaller cars have smaller ball joints by which the steering knuckles are supported and for such small joints, various sizes of sleeves may be provided for mounting on the head 6. For example, a sleeve 50 may be mounted on the end face 14 (see FIG. 11) or a still smaller sleeve 51 may be mounted on the end face 12 and either of these sleeves (see FIG. 12) may have a stepped end surface 52 to accommodate still smaller ball joints.

In addition to the above described uses, for which it is primarily intended, the tool is used for removing and replacing the resilient, torsion resisting bushings by which the steering knuckle supporting arms are connected to the vehicle frame. By way of example, FIG. 13 shows a typical upper supporting arm J together with the cross-shaft member by which it is adjustably secured to the frame structure. For this use, it is necessary to remove the arm and cross-shaft from the vehicle and take it to a work station for bushing replacement.

Referring first to FIG. 14, there is shown the procedure for removing one of these bushings. These bushings, incidentally, comprise spaced inner and outer metallic sleeves. The inner sleeve is fixedly attached to the cross-shaft and the outer sleeve is attached to the supporting arm by the press fit thereof in the opening in the cross-arm. Thus the bushing both serves as a pivoting means for the slight amount of angular movement of the supporting arm and also as a means for vibration insulation of the wheel movement from the vehicle frame. Prior to applying the tool of the present invention to the cross-shaft, the screws and washers at the end of the cross-shaft which secure the inner sleeve of the bushing to the cross-shaft are removed so that the cross-shaft and bushing are capable of endwise movement. A U-shaped block 53 (see FIG. 16) is placed back of the bushing backup flange K' on the cross-shaft K as shown in FIG. 14 and a suitable sleeve here shown as the sleeve 50 is associated with the head 6 and the device is arranged with the shoulders 35 and 36 engaging the block 53 and with the sleeve 50 engaging the face of the member J around the opening J' in which the bushing L is press fitted. Upon rotation of the jackscrew 4 to move the head 6 toward the shoulders 35 and 36, the shaft and bushing will be moved into the cavity inside of the member 50, the release of the opposite end of the shaft K from the other bushing permitting such endwise movement. When the bushing has been pressed out of the member K the device is removed and applied to the other bushing L to remove it in a similar manner. Thereafter, the block 53 and sleeve 50 are discarded and the head 6 is provided with another adaptor to suit the size of bushing involved and the frame members 22 and 32 are adjusted by the screw 41 to engage the opposite sides of the member J (see FIG. 15) and the jackscrew again operated to press the bushing into place first in one of the yoke arms and then in the other. After the device is removed, the end washers and end screws can be applied to the cross-shaft to lock the new bushings against movement relative to the cross-shaft and the supporting arm with the newly installed bushings returned to the vehicle for reassembly into the wheel suspension means.

Thus there has been created a tool which can be employed to great advantage in the servicing of the front ends of motor vehicles where such servicing involves the replacement of the ball joints which support the steering knuckles and which tool is additionally useful for certain other operations one of which has been described. Having reference to FIG. 7, it is to be noted that the various adaptors used with a representative tool can be nested together and secured in place so that the tool can be stored as a compact unit with all of its component parts when not in use.

While the foregoing specification describes a presently preferred embodiment of the invention, the invention is not to be deemed to be limited to the precise details of construction thus disclosed by way of example and it will be understood that the invention includes as well all such changes and modifications in the parts and in the construction, combination and arrangement of parts as shall come within the purview of the appended claims.

I claim:

1. A tool for in situ press fit installation of steering knuckle supporting ball joint assemblies in the wheel suspension supporting arms of motor vehicles, said tool including in combination, a first means affording an abutment for the supporting arm surface at the side opposite the side from which a ball joint assembly is inserted and removed at at least two substantially opposite points adjacent to and outwardly of the ball joint receiving opening in the supporting arm, a second means including a head member provided with at least one annular end surface adapted to engage a portion of a ball joint assembly positioned thereon for entry in the receiving opening in the supporting arm when said first means is caused to engage the surface of the supporting arm, a screw threaded means operable to move one of said first and second means toward the other of said first and second means with resultant press fitting installation in the supporting arm of a ball joint assembly engaged by said second means and devices associated with the other of said first and second means operable to adjust the associated one of said means to accommodate varying widths of supporting arms with which said tool is to be used.

2. A tool as claimed in claim 1 in which said screw threaded means carries a ball joint component engaging member freely rotatably mounted thereon, said ball joint engaging member having a plurality of end surfaces of different diameters complementary to different sizes of ball joint components to be press fitted in supporting arms.

3. A tool as claimed in claim 1 in which said tool includes a first adaptor positionable over the steering knuckle engaging stud of a ball joint assembly to be removed from a supporting arm and positioned to be engaged by said first means, and in which said tool further includes a tubular member adapted to be interposed between said end surface of said second means and the side surface of the supporting arm from which a ball joint is to be removed whereby said tool may be employed as a means for pressing a ball joint assembly out of an opening in the supporting arm.

4. In a tool for removing and installing steering knuckle supporting ball joint assemblies from the wheel suspension supporting arms of motor vehicles, an elongated base member, a pair of frame members each having one end thereof loosely pivotally connected to one each of the opposite ends of said base member and extending therefrom in spaced parallel relation in a direction generally normal to the length of said base member, adjustable means interconnecting the ends of said frame members remote from said base member operable to vary the distance between said remote ends, and a jackscrew means extending through and threadedly engaging said base member intermediate the points of connection of said frame members and extending in a direction generally parallel to said frame members, said jackscrew means at the side of said base member from which said frame members extend carrying means for engaging a surface which extends generally parallel to said base member, and said frame members having shoulder portions facing said base member for engaging another surface generally parallel to said base member, whereby when said tool is used to install a ball joint assembly said means carried by said jackscrew means engages a surface of a ball joint assembly and said shoulder portions engage a surface of a supporting arm.

5. A tool as claimed in claim 4 in which said adjusting means is disposed laterally offset from the axial line of said jackscrew means whereby to afford clearance for the steering knuckle engaging shank component of a ball joint assembly being installed or removed by said tool.

6. A tool as claimed in claim 4 in which said base member is slotted at each end thereof, in which one end of each one said frame members is disposed in one each of said slots, and in which pin elements extend through selected ones of pluralities of holes formed in the arm portions of said base member and through said ends of said frame members to form said loose interconnections between said frame members and said base member.

7. A tool as claimed in claim 4 in which tool includes a perforate member adapted to be fitted over the steering knuckle engaging stud of a ball joint assembly to be removed from a supporting arm and to be engaged by said first means, and in which said tool further includes a tubular member of greater diameter than the portion of the supporting arm defining the opening in which a ball joint is press fitted and adapted to be interposed between the end of said second means and the side surface of the supporting arm from which the ball joint assembly is removed whereby said tool is capable of employment as a means for pressing a ball joint assembly out of an opening in the supporting arm means.

References Cited
UNITED STATES PATENTS

| | | | |
|---|---|---|---|
| 1,388,839 | 8/1921 | Allen | 29—261 |
| 1,782,037 | 11/1930 | Grebenstein | 29—261 |
| 1,970,682 | 8/1934 | Yordi | 29—263 |
| 2,191,021 | 2/1940 | Ladd | 29—261 X |
| 3,099,079 | 7/1963 | Stein | 29—275 |

MYRON C. KRUSE, *Primary Examiner.*